Figure 1:
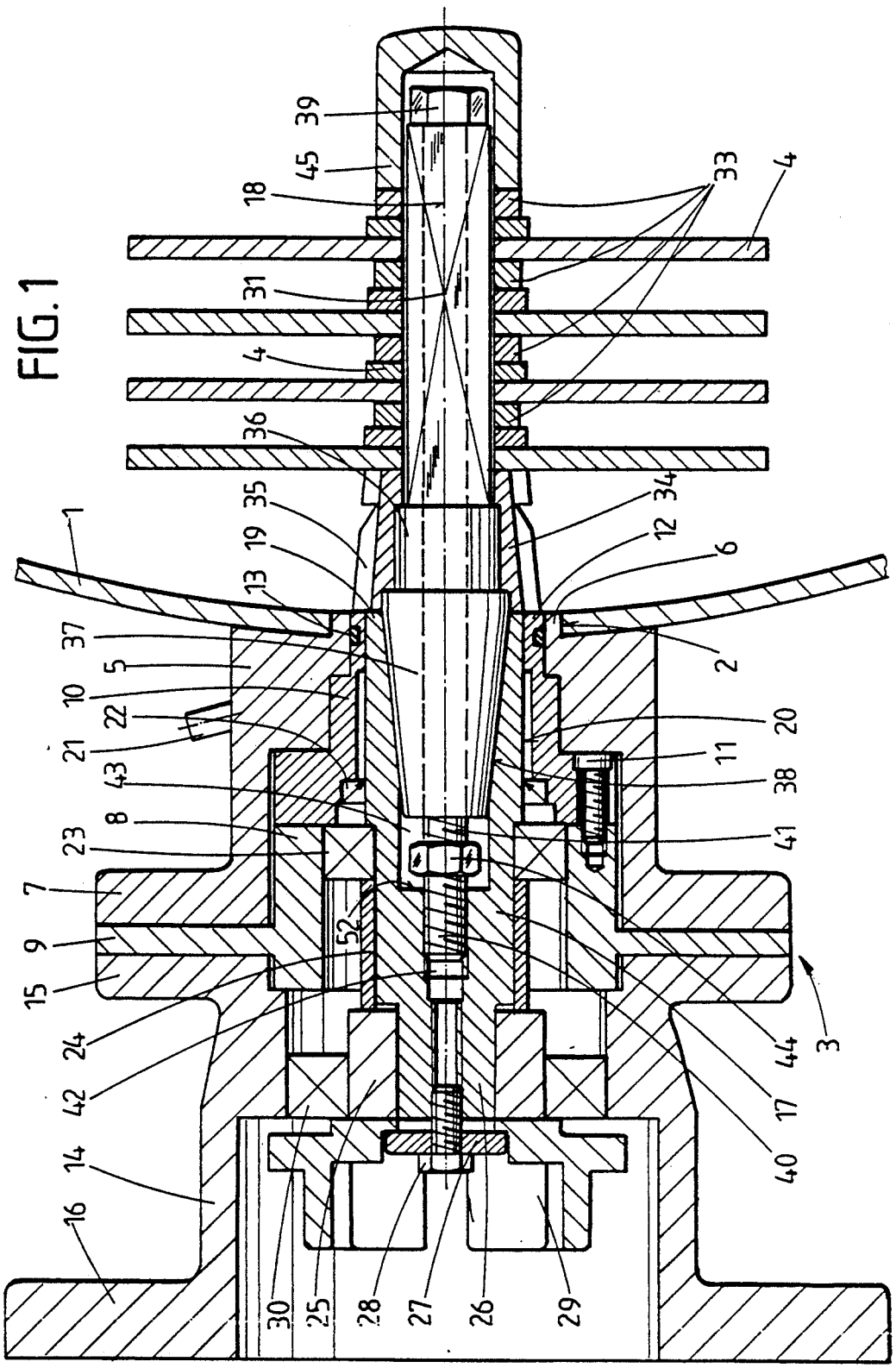

United States Patent [19]

Schmidt

[11] Patent Number: 4,997,285

[45] Date of Patent: Mar. 5, 1991

[54] MACHINE FOR HANDLING POURABLE, PASTY, AND/OR FLUID MATERIALS WITH A BUILT-IN DISINTEGRATOR

[75] Inventor: Alfons Schmidt, Delbrück-Bentfeld, Fed. Rep. of Germany

[73] Assignee: Gebruder Lodige Maschinenbaugesellschaft mbH, Paderborn, Fed. Rep. of Germany

[21] Appl. No.: 406,793

[22] Filed: Sep. 13, 1989

[30] Foreign Application Priority Data

Sep. 17, 1988 [DE] Fed. Rep. of Germany ....... 3831609

[51] Int. Cl.⁵ .................................................. B01F 7/00
[52] U.S. Cl. ................................. 366/279; 241/101 B
[58] Field of Search ............... 366/279, 314, 315, 316, 366/317, 325, 331, 292, 205; 241/282.1, 282.2, 101 B, 199.12

[56] References Cited

U.S. PATENT DOCUMENTS

| Re. 20,313 | 3/1937 | Kirby | 366/331 |
|---|---|---|---|
| 2,875,800 | 3/1959 | Urschel | 241/282.1 |
| 3,044,514 | 7/1962 | Schnell | 241/282.2 |
| 3,051,208 | 8/1962 | Schnell | 241/282.2 |
| 3,319,938 | 5/1967 | Swanke et al. | 241/282.2 |
| 3,325,107 | 6/1967 | Peterson | 241/282.2 |
| 3,848,816 | 11/1974 | Morley | 241/282.1 |
| 3,899,159 | 8/1975 | Nauta | 366/292 |
| 4,010,932 | 3/1977 | Otto | 366/292 |
| 4,087,053 | 5/1978 | Voglesonger | 241/282.1 |
| 4,123,801 | 10/1978 | Armanet | 366/292 |
| 4,511,093 | 4/1985 | Ohkoshi et al. | 241/101 B |
| 4,560,111 | 12/1985 | Cavalli | 241/282.2 |
| 4,650,337 | 3/1987 | Otto | 241/101 B |
| 4,834,549 | 5/1989 | Taniguchi et al. | 366/314 |
| 4,860,960 | 8/1989 | Schwarz | 241/199.12 |

Primary Examiner—Robert W. Jenkins
Attorney, Agent, or Firm—Pearne, Gordon, McCoy & Granger

[57] ABSTRACT

The invention relates to a machine for handling pourable, pasty and/or fluid materials with disintegrating devices secured to the wall of the container. In known machines, to replace the disintegrating devices, it is necessary to remove them complete with the drive, for which purpose a relatively large opening is necessary in the wall of the container, and much time and work is involved. In the novel machine the shaft of the disintegrating device is made in two mutually separable parts so that the part carrying the pulverizing tools can be inserted and removed from inside the container, while the other part is permanently secured on the outside. It therefore requires only relatively small openings in the wall of the container and the opening, if not needed, can be closed off simply by the use of a plug-in cover. Insertion and removal of the tools is rapid and involves only a single screw.

6 Claims, 2 Drawing Sheets

MACHINE FOR HANDLING POURABLE, PASTY, AND/OR FLUID MATERIALS WITH A BUILT-IN DISINTEGRATOR

DESCRIPTION

The invention relates to a machine for handling pourable, pasty and/or fluid materials which comprises a container for receiving the materials for treating them and at least one disintegrating device mounted in the wall of the container for acting on the material to be treated in the container. The disintegrating device has a shaft projecting through an opening in the wall of the container, a bearing secured on the external face of the container of the machine with a motor connected to it for driving the shaft and disintegrating tools for the materials to be treated in the container, carried on that part of the rotatably mounted driven shaft which projects into the container.

The invention is applicable to all types of such machines which have a disintegrating device for the materials to be handled, for example mixing machines, granulating machines, drying machines, reactors of all kinds and the like. The container for such machines can be of any desired construction and can be arranged equally well upright or on its side.

In such machines, it is known to incorporate disintegrating devices on their own or in addition to mixing means, in such a way that the part of such devices comprising the disintegrating tools such as pulverising tools projects into the interior of the container through the wall of the container, for example a cylindrical container, of which the longitudinal axis may be horizontal or equally well vertical, whilst the bearing and the drive are mounted on the wall of the container on the outside of the container. Such disintegrating devices, of which one or more can be provided on a machine, have to be detached or exchanged occasionally or more frequently, for example if one exchanges the tools of the mixer of such a machine for dealing with particular materials to be mixed or if different disintegrating or pulverising tools are required for disintegrating or pulverising the materials to be handled in the machine. For this purpose, it is usual, in the case of known disintegrating devices, to remove them from outside the container of the machine, for which purpose one must first disconnect all necessary connections for supplying energy, then the motor must be removed and finally the bearing with the shaft associated with it and the disintegrating tools mounted on the latter. This is not only labour-intensive and time-consuming but also requires a relatively large opening in the wall of the container, which opening has to be large enough in order to be able to pass through it the shaft complete with the disintegrating tools mounted on it. After that the disintegrating tools must be removed from the shaft and replaced by tools of a different form and/or layout before the disintegrating device in question can be put back. During the whole of the change-over time the disintegrating device and also the machine which is equipped with it are out of use.

The object of the invention is to reduce significantly the down-time of the machine necessary for the replacement of the disintegrating devices of machines of the kind stated in the introduction above.

This problem is solved according to the invention in that the shaft of each disintegrating device is constructed in two parts and the part of the shaft which projects into the container is secured to the part which is arranged in the bearing in a manner allowing it to be detached from that part. In other words, it is proposed according to the invention to construct the disintegrating devices of the machine in such a way that the part carrying the disintegrating tools can be inserted and removed from inside the container, which in many cases does not present any space problems because in the case of containers which are upright or containers with a vertically-extending axis, the interior of the container is easily accessible through the relatively large lid, whilst in the case of cylindrical or drum-shaped containers with a horizontal longitudinal axis relatively large flap closures are generally provided for supplying and/or emptying as well as cleaning, through which servicing personnel can reach the interior of the container and work within it without difficulty.

For replacement of the disintegrating tools, in the machine constructed in accordance with the invention in contrast to the known state of the art, it is not necessary to take apart or remove the bearing and the drive of the shaft of the individual disintegrating devices in order to replace the disintegrating tools, so that the removal and insertion of the disintegrating tools can be performed without excessive expenditure in time and effort. The replacement of the part of the shaft of each disintegrating device carrying the disintegrating tools can be performed outside the machine without the machine having to be put out of action for this purpose. The down-times of the machine necessary for modification of the disintegrating devices are accordingly restricted to those periods which are needed solely for the insertion and removal of the part of the shaft which is detachable from the shaft bearing. For modification of the disintegrating devices in particular one does not need to take apart the bearing itself with the motor mounted on it and the energy supply, so that also any casing which may be present on the machine or other hindrances present on the outside of the machine do not have to be removed for the modification.

Furthermore, it is possible, for particular situations, to put the disintegrating device completely out of service, in that the part of the disintegrating device which projects into the container of the machine is removed and the relatively small opening which is left in the wall of the container is closed off by the insertion of a detachable cap.

By virtue of the invention there is provided the possibility of converting machines with disintegrating devices projecting into their treatment containers, such as pulverising devices, with a relatively small outlay in work and in particular in time, with regard to the disintegrating devices, so that the down-times of the machine necessary for this purpose can be reduced significantly in comparison with the previously known machines of the kind in question.

Further particular and advantageous features of the invention are the subject of the subsidiary claims.

Figure 2:
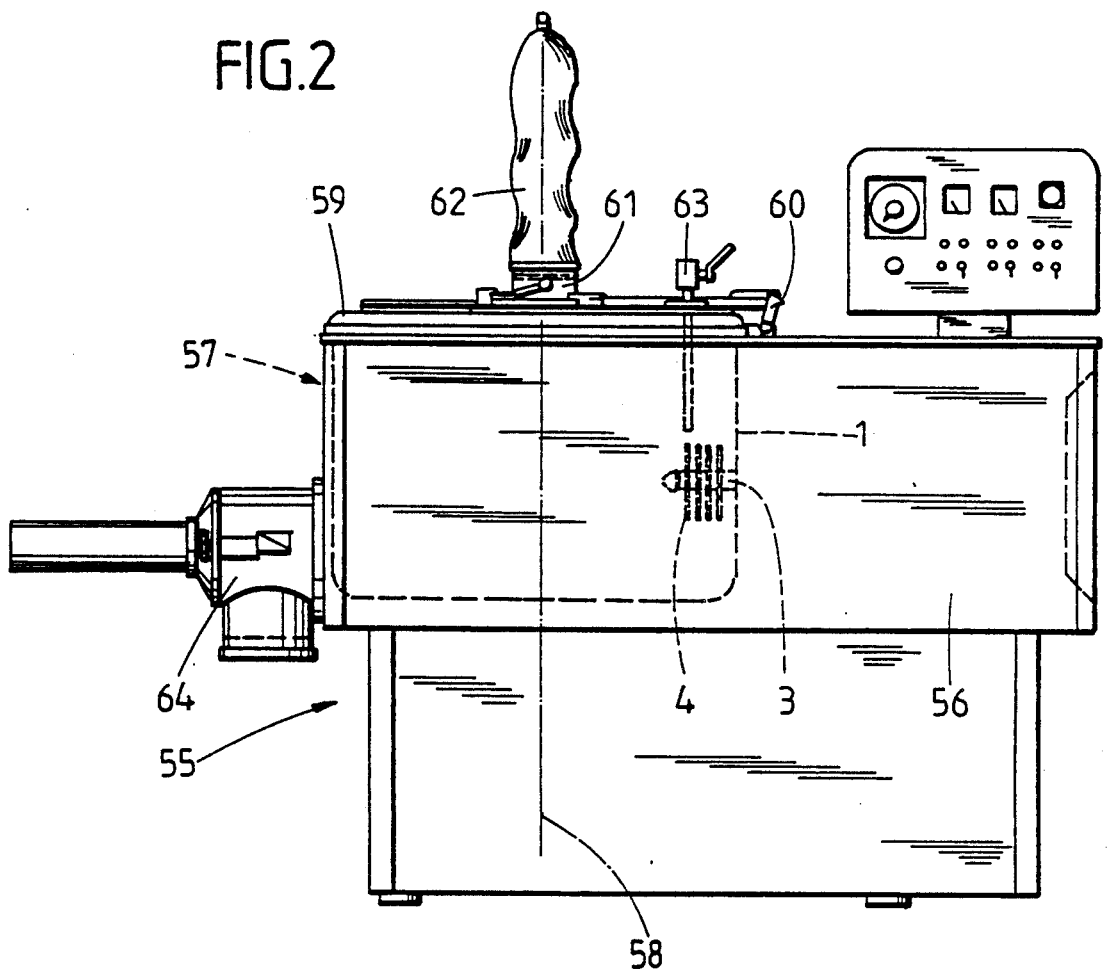
Figure 3:
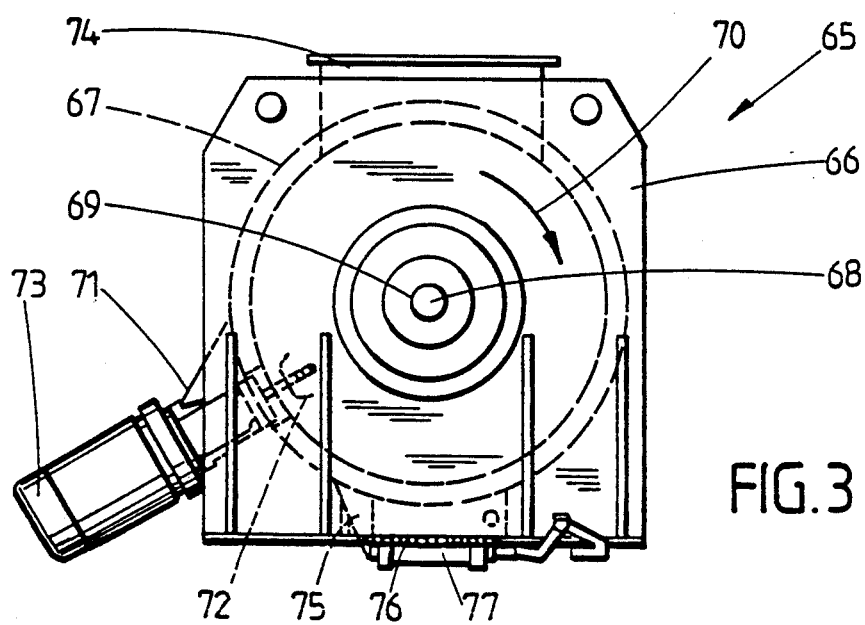

Two embodiments by way of example of machines incorporating the invention for the treatment of pourable, pasty, and/or fluid materials are illustrated in the drawing, in which:

FIG. 1 is a horizontal section through an only partially illustrated cylindrical container of the machine and a disintegrating device projecting into this container which is arranged with its central axis upstanding or extending vertically, which device carries knife-like pulverising tools within the container, FIG. 2 is a diagrammatically illustrated side view of the machine of FIG. 1 in which the disintegrating device incorporated in the container of this machine is indicated, and FIG. 3 is an end-on view of a different embodiment of the machine which has a drum-shaped container with a horizontally extending longitudinal axis, into which projects a disintegrating device equipped with pulverising tools different from those of FIGS. 1 and 2 but still in accordance with the invention.

Of a mixing granulator with a vertically disposed drum-shaped container, there is shown in FIG. 1 only a part of the vertically extending cylindrical side wall 1. This side wall 1 contains a round opening 2 for receiving a disintegrating device 3 which, in the embodiment illustrated by way of example, is formed as a pulverising device with knife-like pulverising tools 4.

Mounted on the outside of the container wall 1 is a bearing housing 5 which has a collar-shaped projection 6 projecting into the opening 2 and completely filling it. The bearing housing 5 is secured on the outside of the container wall 1, for example being welded to the wall. On that end which is furthest from the wall 1, there is mounted the bearing housing 5 with a radially-outwardly projecting flange 7 which serves for the attachment of further components of the bearing, as explained in detail below.

A cylindrical bearing bush 8 mounted in the housing 5 is secured to the flange 7 by means of a radially projecting flange 9 which has on that end of it which is towards the container wall 1 a cylindrical bush 10 secured by means of screws 11. The outer neck-shaped end 12 of this bush projects into the extension 6 of the bearing housing 5 and terminates in a collar flush with the outer end of this extension on the inner face of the container wall 1. A sealing ring 13 takes care of sealing it with respect to the inside surface of the extension 6 of the bearing housing 5.

A further bearing housing 14 is mounted on the opposite end of the bearing bush 8 by means of a radial flange 15. The flanges 7, 9 and 15 are secured together by means of screws, not shown. On its opposite end, the bearing housing 14 is provided with a further flange 16 which serves for mounting a motor, not shown in FIG. 1.

The disintegrating device 3 is equipped with a two-part shaft, the part 17 which is made of sleeve-like form being arranged outside the container wall 1, whilst the other part 18 of the shaft, of male form, is present substantially wholly on the inside of the container wall 1 and thereby within the drum-shaped container.

The sleeve-shaped or female shaft portion 17 has its leading end 19 projecting into the forward end 12 of the bush 11 and ends flush with this end and the end of the extension 6 of the bearing housing 5. Between the outside of the shaft portion 17 and the inside wall of the bush 10 there is an annular space 20 which narrows down to an annular gap towards the interior of the container, through which air can be blown, supplied under pressure through a hose 21, in order to prevent particles of the material being treated in the container of the machine being able to penetrate through the narrow annular gap into the bearing. At the opposite end of the annular space 20 there is a shaft seal 22 which engages the outside of the one shaft portion 17 and prevents the compressed air being able to escape in the opposite direction.

A ball bearing 23 is mounted on the female shaft portion 17 and has its outer race secured between the bearing bush 8 and the bush 10, whilst its inner race engages a shoulder on the shaft portion 17 and is urged against this shoulder by a spacer sleeve 24. The spacer sleeve is clamped by a bush 25 which fits onto a projection 26 of the shaft portion 17 of reduced diameter and is put under pressure by a hexagon screw 28 screwed into the extension 26 and acting on a washer 27. At the outer end a dog-clutch half 29 is secured by the washer 27 and screw 28, forming part of a clutch connected to the motor.

A further ball bearing 30 is arranged on the bush 25 as a second bearing for the shaft portion 17, which fits in the bearing housing 14 with some axial play.

The detachable shaft portion 18 has a portion 31 which is of polygonal shape in cross-section, on which are fitted the knife-shaped pulverising tools 4, having appropriately shaped central openings and displaced relative to one another by 90°. Spacer rings 33 take care of the correct mutual arrangement and desired spacing between the cutting tools, of which four pairs altogether are shown in the drawing. Between the tool 4 which is nearest the wall 1 of the container and the wall itself there is a spacer bush 34 which abuts against the outer end 19 of the other shaft portion 17. Outwardly projecting vane-shaped extensions 35, terminating a small distance from the inside of the container wall 1 ensure that material present in the container in the region of the bearing is flung clear so that no deposits of material can build-up where the shaft passes through.

The shaft portion 18 has, within the spacer bush 34, a cylindrical portion 36 which terminates in a frusto-conical or conical portion 37. This portion 37 fits into a corresponding conically formed central bore 38 in the female other portion 17 of the shaft, the cone angle of the portion 37 and of the bore 38 being selected so that the connection between the inserted conical portion 37 and the female shaft portion 17 cannot come apart of its own accord. On the contrary a self-jamming rotation-tight connection is obtained between the plugged-together shaft portions 17 and 18.

To free the connection between the two shaft portions 17 and 18 the portion 18 is provided with a central bore extending right through it, and receiving a screw 39 with a hexagon head. This screw 39 has the outer end 40 of its threaded portion 41 screwed into a threaded bore 42 extending from the inner end of the bore 38 present in the shaft portion 17. There is a nut 44 on the screw-threaded portion 41 between the conical portion 37 of the shaft portion 18 and the bottom end 52 of a cylindrical extension 43 of the initially conical bore 38, this nut being connected non-rotatably to the screw thread 41, for example by means of a key or a grub screw.

A cap nut 45 is fitted over the outer end of the shaft portion 18 and the head of the screw 39 and clamps together under pressure those parts of the disintegrating device which are on the shaft portion 18.

In order to free the shaft portion 18 from the shaft portion 17 and thereby to remove the pulverising tools 4, first the cap nut 45 is removed, after which a spanner is placed on the head of the screw 39 and using this the screw 39 can be unscrewed out of the threaded hole 42. This causes the nut 44 to approach the outer end of the conical portion 37 of the shaft portion 18. As soon as the nut 44 comes into engagement with the outer end of the conical portion 37 it presses against this end on further rotation of the screw 39, forcing the conical portion 37 out of the conical bore 38. When the screw 39 has been completely unscrewed out of the bore 42 the portion of the disintegrating device 3 which is present within the container can be removed. For the installation of this portion of the disintegrating device 3, the head of the screw 39 presses against the opposite face of the shaft portion 18 and ultimately brings the conical portion 37 of the shaft portion 18 into frictional engagement in the conical side wall of the bore 38, when the screw 39 has been screwed far enough into the threaded bore 32. The nut 44 does not prevent this.

In FIG. 2, the mixing granulator 55, indicated only partially in FIG. 1 is shown in full side view. A trough-shaped container 57 having a cylindrical plan view is arranged in a frame 56 with its central axis 58 extending vertically, its upper end being closed by a lid 59 which can be swung back on a hinge 60. An upstanding spigot 61 is present in the centre of the lid 59, with a sack-shaped dust collector 62 arranged on it for ventilation.

From FIG. 2 it can be seen that a disintegrating device 3 of the kind illustrated in detail in FIG. 1 is mounted in the side wall 1 of the container 57. Equally, several such disintegrating devices could be provided.

A fluid can be introduced into the neighbourhood of the knife-shaped pulverising tools 4 of the disintegrating device 3 through a pipe system 63.

The container 57 can be emptied, for example through an emptying system 64 not described further here, but it is also possible for emptying to take place through the upper end, closed by the lid 59. The lid 59 is swung back for introducing and removing the part of the disintegrating device 3 which has the pulverising tools 4.

Further tools can be arranged in the container 57, mounted to rotate about the vertical axis 58 and having a shape and path of movement such that they do not collide with the pulverising tools 4 of the disintegrating devices 3.

The mixing machine 65 illustrated in FIG. 3 has a cylindrical or drum-shaped mixing container 67 with a horizontally extending central axis 68, between vertically extending side walls 66. Mixing tools, not illustrated here, are secured on a shaft 69 extending along this axis 68 and the tools can rotate in the container 67 in the direction of an arrow 70.

Disintegrating devices 71 are secured on the cylindrical wall of the container 67, only one of them being shown in FIG. 3. These devices 71 correspond largely to the device shown in FIG. 1, but in this embodiment the pulverising tools 72 are cup-shaped. Also in practice only one pair of pulverising tools is provided in one plane. The driving motor 73 for the disintegrating device 71 is shown in FIG. 3. It can be seen that it is very much easier and less expensive if, for exchanging the pulverising tools 72, only that portion of the disintegrating device 71 which projects into the container 67 has to be removed and the remaining part of this device, including the driving motor 73, can remain on the container 67.

The cylindrical or drum-shaped container 67 has on its upper wall a dome-shaped filling neck 74, which can be closed off in a manner not shown. Outlet spigots 75 with closing caps are present in the lower part of the drum-shaped container 67 and the caps can be operated by means of a pneumatic or hydraulic cylinder 77.

The insertion and removal of the part of the disintegrating device 71 which has the pulverising tools 72 can be performed both through the dome and also through the opening in the floor. The container 67 can also have additional lateral openings in its cylindrical wall, through which the part of the disintegrating device 71 containing the pulverising tools 72 is accessible. These openings, which can be closed by means of a cap, are not shown in FIG. 3.

I claim:

1. A machine for handling pourable, pasty and/or fluid materials, said machine comprising a container for receiving the materials to be treated, said container having a wall and at least one disintegrating device for said materials, said disintegrating device being mounted on said wall and having a shaft projecting through an opening in said wall, a bearing secured on the outside of said container, a driving motor connected to said shaft and disintegrating device for said materials carried on that part of said shaft which projects into the interior of said container, wherein the improvement comprises that said shaft is made in two parts, a first part thereof which projects into said container being secured in a detachable manner to a second part thereof which is mounted in said bearing, whereby upon detachment of said first shaft part from said second shaft part and removal thereof from said container, the wall of said container is without any substantial portion of said device projecting into said container.

2. The machine set forth in claim 1 wherein said first and second parts of said shaft have a mutual, plug-in interengagement, one into the other.

3. The machine set forth in claim 2 wherein said mutual interengagement comprises a conical male portion on one of said parts plugging into a co-operating female portions on the other of said parts.

4. The machine set forth in claim 1 wherein said first part of said shaft is capable of being withdrawn from said second part of said shaft, said second part being permanently mounted in said bearing.

5. A machine for handling pourable, pasty and/or fluid materials, said machine comprising a container for receiving the materials to be treated, said container having a wall and at least one disintegrating device being mounted on said wall and having a shaft projecting through an opening in said wall, a bearing secured on the outside of said container, a driving motor connected to said shaft, and a disintegrating device for said materials carried on that part of said shaft which projects into the interior of said container, wherein the improvement comprises that said shaft is made in two parts, a first part thereof which projects into said container being secured in a detachable manner to a second part thereof which is mounted in said bearing, said shaft is provided with a bore extending axially therethru, and a clamping means is arranged in said bore for preventing relative rotation of said first and second parts of said shaft.

6. The machine set forth in claim 5 further comprising a stop arranged on said clamping means and positioned between said first and second parts of said shaft with clearance.

* * * * *